United States Patent
Li et al.

(10) Patent No.: US 9,637,590 B2
(45) Date of Patent: May 2, 2017

(54) METHOD FOR SYNTHESIZING POLYLACTIDE VIA LIVING RING-OPENING POLYMERIZATION

(71) Applicant: Nanjing University, Nanjing (CN)

(72) Inventors: Hong Li, Nanjing (CN); Quanxing Zhang, Nanjing (CN); Wei Huang, Nanjing (CN); Jiaye Sheng, Nanjing (CN); Aimin Li, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/269,942

(22) Filed: Sep. 19, 2016

(65) Prior Publication Data

US 2017/0009011 A1 Jan. 12, 2017

Related U.S. Application Data

(63) Continuation-in-part of application No. PCT/CN2016/076957, filed on Mar. 22, 2016.

(30) Foreign Application Priority Data

Jun. 11, 2015 (CN) .......................... 2015 1 0319853

(51) Int. Cl.
  *C08G 63/00* (2006.01)
  *C08G 63/82* (2006.01)
  *C08G 63/08* (2006.01)

(52) U.S. Cl.
  CPC ........... *C08G 63/823* (2013.01); *C08G 63/08* (2013.01)

(58) Field of Classification Search
  CPC ..................................................... C08G 63/823
  USPC ........................................ 528/271, 272, 273
  See application file for complete search history.

(56) References Cited

U.S. PATENT DOCUMENTS

2013/0053564 A1* 2/2013 Selifonov ............ C07D 319/06
  544/374

* cited by examiner

*Primary Examiner* — Terressa Boykin
(74) *Attorney, Agent, or Firm* — Matthias Scholl, PC; Matthias Scholl

(57) ABSTRACT

A method for synthesizing polylactide (PLA). The method employs RCOOCG, a nontoxic carboxylate of cyclic guanidine (CG), as a catalyst and non-toxic organic alcohol R'OH as an initiator to catalyze/initiate a living ring-opening polymerization of lactide (LA). The method includes: 1) adding monomer LA, the catalyst RCOOCG, and the initiator R'OH to a reaction still, where an initial molar ratio of the monomer to the catalyst is $[LA]_0/[RCOOCG]_0=1000\text{-}1500:1$, an initial molar amount $[R'OH]_0$ of the initiator R'OH is determined by a number average molecular weight ($M_n$) of a target product PLA; 2) removing air in the reaction still, sealing the reaction still after a pressure in the reaction still is constant at between 1.0 and 0.1 torr; stirring and heating the reaction still in 30 to 40 minutes to a temperature between 95 and 96° C.; and allowing reactants in the reaction still to polymerization.

8 Claims, No Drawings

METHOD FOR SYNTHESIZING POLYLACTIDE VIA LIVING RING-OPENING POLYMERIZATION

CROSS-REFERENCE TO RELATED APPLICATIONS

This application is a continuation-in-part of International Patent Application No. PCT/CN2016/076957 with an international filing date of Mar. 22, 2016, designating the United States, now pending, and further claims priority benefits to Chinese Patent Application No. 201510319853.6 filed Jun. 11, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for synthesizing polylactide via a living ring-opening polymerization of lactide using organic guanidine as a catalyst and nontoxic organic alcohol as an initiator.

Description of the Related Art

Polylactide (PLA), a synthetic polyester features excellent biodegradability and biocompatibility, have found significant biomedical applications as drug-delivery carriers and so forth. Therefore, it requires that: (1) PLA can be synthesized with the controlled number-average molecular weight ($M_n$) ranged from $0.5 \times 10^4$ to $5.0 \times 10^4$ for different delivery period; (2) PLA should not contain any toxic heavy metal or organic/inorganic catalyst residue.

Conventionally, the synthesis of PLA employed stannous octoate ($SnOct_2$) as a catalyst. However, the cytotoxicity of $SnOct_2$ has aroused deep concern about the biosafety of materials because, in practice, it is impossible to entirely remove the toxic catalyst residue from the product polymer PLA. In addition, $SnOct_2$ cannot realize the controlled synthesis of PLA via living ring-opening polymerization (ROP).

SUMMARY OF THE INVENTION

In view of the above-described background, the main objective of the present invention to provide a method for controlled synthesizing biodegradable polylactide (PLA) via a living ring-opening polymerization of lactide. The catalyst and the initiator used in the invention is organic guanidine and nontoxic organic alcohol respectively, which are highly effective. The synthesis process is controllable, and the obtained product features high biological safety.

To achieve the above objective, in accordance with one embodiment of the invention, there is provided a method for controlled synthesizing biodegradable polylactide (PLA). The method employs RCOOCG a nontoxic carboxylate (RCOOH) of cyclic guanidine (CG), as a catalyst and a nontoxic organic alcohol R'OH (R'=—$CH_2CH_3$ or —$(CH_2)_{11}CH_3$) as an initiator to catalyze/initiate a living ring-opening polymerization of lactide (LA).

Specifically, the method comprises the following steps:

1) adding monomer LA, the catalyst RCOOCG, and the initiator R'OH to a reaction still, wherein an initial molar ratio of the monomer to the catalyst is $[LA]_0/[RCOOCG]_0 = 1000\text{-}1500:1$, an initial molar amount $[R'OH]_0$ of the initiator R'OH is determined by a number average molecular weight ($M_n$) of a target product PLA, which is calculated as follows:

$$[R'OH]_0 = \frac{[LA]_0 \times 144}{M_n}$$

wherein $[LA]_0$ is an initial molar amount of the monomer; and 2) removing the air in the reaction still through a repeated operation of "vacuum pumping-nitrogen injection"; sealing the reaction still after the pressure in the reaction still is constant at between 1.0 and 0.1 torr; heating the reaction still with stirring to a temperature between 95 and 96° C. in 30 to 40 minutes; allowing the reactants to react for 5 to 300 minutes at a temperature between 96±1 and 130±1° C.

In a class of this embodiment, the number average molecular weight ($M_n$) of the PLA is controlled at between $0.5 \times 10^4$ and $5.0 \times 10^4$ according to actual application by adjusting the initial molar ratio of the monomer to the initiator $[LA]_0/[R'OH]_0$. The polydispersity index PDI of the product is between 1.10 and 1.25; the conversion of the monomer in the polymerization is 100%, and the product is snow white.

In a class of this embodiment, the lactide (LA) is anyone selected from L-lactide (LLA), D-lactide (DLA), or rac-lactide (DLLA); the polylactide (PLA) is anyone selected from poly(L-lactide) (PLLA), poly(D-lactide) (PDLA), or poly(D,L-lactide) (PDLLA).

In a class of this embodiment, the catalyst cyclic guanidine carboxylate RCOOCG is produced by a reaction of cyclic guanidine (CG) and nontoxic organic carboxylic acid (RCOOH); CG is 2-aminobenzoimidazole, guanine, 1,5,7-triazabicyclo [4.4.0]dec-5-ene, 7-methyl-1,5,7-triazabicyclo [4.4.0]dec-5-ene, or 2,3,5,6-tetrahydro-1H-imidazo[1,2-A] imidazole; RCOOH is lactic acid, glycolic acid, benzoic acid, or acetic acid; a preparation principle of the catalyst is as follows:

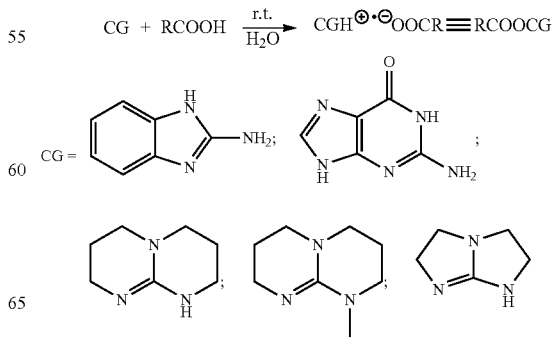

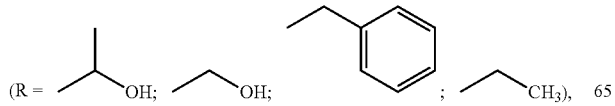

-continued

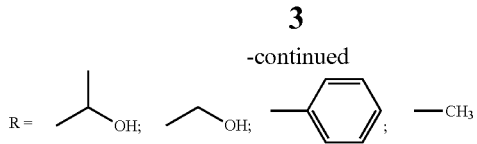

In a class of this embodiment, the nontoxic organic initiator R'OH is ethanol (R'=—CH$_2$CH$_3$) or lauryl alcohol (R'=—(CH$_2$)$_{11}$CH$_3$).

Compared with existing technologies, advantages of the method for synthesizing polylactide according to embodiments of the invention are given below:

1. The catalyst of cyclic guanidine carboxylate RCOOCG features high catalytic activity and low consumption; the initiator of organic alcohol is safe and nontoxic.
2. The number average molecular weight ($M_n$) of the PLA is controlled; the PLA product has a narrow PDI, contains no monomer residue, and is snow white.
3. The target product PLA is synthesized through a bulk ring-opening polymerization of LA, no solvent is involved and no pollutant is produced, so that the synthetic process is environmentally friendly.
4. The final product PLA features high biosafety and has a wide range of application in biochemical field.

DETAILED DESCRIPTION OF THE EMBODIMENTS

For further illustrating the invention, experiments detailing a method for synthesizing polylactide are described below. It should be noted that the following examples are intended to describe and not to limit the invention.

Example 1

The monomer LLA (50.0 g, 0.347 mol), the catalyst 2-aminobenzoimidazole glycollate (0.048 g, 0.231 mmol), and the initiator ethanol (0.461 g, 10.000 mmol) were added to a reaction still. The air in the reaction still was removed through three times of repeated operation of "vacuum pumping-nitrogen injection". Then the reaction still was sealed after the pressure in the reaction still was constant at 1.0 torr; the reactants were stirred and the reaction still was heated to 96° C. in 30 minutes. Finally, the reactants reacted for 5 minutes at 130±1° C. The resulted PLLA product: $M_n$ 0.5×10$^4$, PDI 1.14, monomer conversion rate 100%, snow white.

Example 2

The monomer DLA (50.0 g, 0.347 mol), the catalyst 1,5,7-triazabicyclo[4.4.0]dec-5-ene benzoate (0.060 g, 0.231 mmol), and the initiator ethanol (0.230 g, 5.000 mmol) were added to a reaction still. The air in the reaction still was removed through three times of repeated operation of "vacuum pumping-nitrogen injection". Then the reaction still was sealed after the pressure in the reaction still was constant at 1.0 torr; the reactants were stirred and the reaction still was heated to 96° C. in 30 minutes. Finally, the reactants reacted for 30 minutes at 125±1° C. The resulted PLLA product: $M_n$ 1.0×10$^4$, PDI 1.15, monomer conversion rate 100%, snow white.

Example 3

The monomer DLLA (100.0 g, 0.694 mol), the catalyst 2,3,5,6-tetrahydro-1H-imidazo[1,2-A]imidazole lactate (0.095 g, 0.463 mmol), and the initiator ethanol (0.307 g, 6.667 mmol) were added to a reaction still. The air in the reaction still was removed through three times of repeated operation of "vacuum pumping-nitrogen injection". Then the reaction still was sealed after the pressure in the reaction still was constant at 0.6 torr; the reactants were stirred and the reaction still was heated to 96° C. in 30 minutes. Finally, the resulted reactants reacted for 60 minutes at 118±1° C. The resulted PLLA product: $M_n$ 1.5×10$^4$, PDI 1.10, monomer conversion rate 100%, snow white.

Example 4

The monomer LLA (100.0 g, 0.694 mol), the catalyst guanine acetate (0.098 g, 0.463 mmol), and the initiator ethanol (0.230 g, 5.000 mmol) were added to a reaction still. The air in the reaction still was removed through three times of repeated operation of "vacuum pumping-nitrogen injection". Then the reaction still was sealed after the pressure in the reaction still was constant at 0.6 torr; the reactants were stirred and the reaction still was heated to 96° C. in 30 minutes. Finally, the reactants reacted for 80 minutes at 115±1° C. The resulted PLLA product: $M_n$ 2.0×10$^4$, PDI 1.18, monomer conversion rate 100%, snow white.

Example 5

The monomer DLA (150.0 g, 1.042 mol), the catalyst 7-methyl-1,5,7-triazabicyclo[4.4.0]dec-5-ene acetate (0.185 g, 0.868 mmol), and the initiator ethanol (0.276 g, 6.000 mmol) were added to a reaction still. The air in the reaction still was removed through three times of repeated operation of "vacuum pumping-nitrogen injection". Then the reaction still was sealed after the pressure in the reaction still was constant at 0.4 torr; the reactants were stirred and the reaction still was heated to 96° C. in 30 minutes. Finally, the reactants reacted for 120 minutes at 112±1° C. The resulted PLLA product: $M_n$ 2.5×10$^4$, PDI 1.21, monomer conversion rate 100%, snow white.

Example 6

The monomer DLLA (150.0 g, 1.042 mol), the catalyst 1,5,7-triazabicyclo [4.4.0]dec-5-ene lactate (0.185 g, 0.868 mmol), and the initiator ethanol (0.932 g, 5.000 mmol) were added to a reaction still. The air in the reaction still was removed through three times of repeated operation of "vacuum pumping-nitrogen injection". Then the reaction still was sealed after the pressure in the reaction still was constant at 0.4 torr; the reactants were stirred and the reaction still was heated to 95° C. in 40 minutes. Finally, the reactants reacted for 150 minutes at 108±1° C. The resulted PLLA product: $M_n$ 3.0×10$^4$, PDI 1.23, monomer conversion rate 100%, snow white.

Example 7

The monomer LLA (200.0 g, 1.389 mol), the catalyst 7-methyl-1,5,7-triazabicyclo[4.4.0]dec-5-ene glycollate (0.265 g, 1.157 mmol), and the initiator lauryl alcohol (1.065 g, 5.714 mmol) were added to a reaction still. The air in the reaction still was removed through three times of repeated operation of "vacuum pumping-nitrogen injection". Then the reaction still was sealed after the pressure in the reaction still was constant at 0.2 torr; the reactants were stirred and the reaction still was heated to 95° C. in 40 minutes. Finally, the reactants reacted for 180 minutes at 105±1° C. The resulted PLLA product: $M_n$ 3.5×10$^4$, PDI 1.20, monomer conversion rate 100%, snow white.

Example 8

The monomer DLA (200.0 g, 1.389 mol), the catalyst guanine benzoate (0.380 g, 1.389 mmol), and the initiator lauryl alcohol (0.932 g, 5.000 mmol) were added to a reaction still. The air in the reaction still was removed through three times of repeated operation of "vacuum pumping-nitrogen injection". Then the reaction still was sealed after the pressure in the reaction still was constant at 0.2 torr; the reactants were stirred and the reaction still was heated to 95° C. in 40 minutes. Finally, the reactants reacted for 220 minutes at 102±1° C. The resulted PLLA product: $M_n$ 4.0×10$^4$, PDI 1.21, monomer conversion rate 100%, snow white.

Example 9

The monomer DLLA (250.0 g, 1.736 mol), the catalyst 2-aminobenzoimidazole acetate (0.335 g, 1.736 mmol), and the initiator lauryl alcohol (1.035 g, 5.556 mmol) were added to a reaction still. The air in the reaction still was removed through three times of repeated operation of "vacuum pumping-nitrogen injection". Then the reaction still was sealed after the pressure in the reaction still was constant at 0.1 torr; the reactants were stirred and the reaction still was heated to 95° C. in 40 minutes. Finally, the reactants reacted for 250 minutes at 99±1° C. The resulted PLLA product: $M_n$ 4.5×10$^4$, PDI 1.22, monomer conversion rate 100%, snow white.

Example 10

The monomer LLA (250.0 g, 1.736 mol), the catalyst 2,3,5,6-tetrahydro-1H-imidazo[1,2-A]imidazole glycollate (0.325 g, 1.736 mmol), and the initiator lauryl alcohol (0.932 g, 5.000 mmol) were added to a reaction still. The air in the reaction still was removed through three times of repeated operation of "vacuum pumping-nitrogen injection". Then the reaction still was sealed after the pressure in the reaction still was constant at 0.1 torr; the reactants were stirred and the reaction still was heated to 95° C. in 40 minutes. Finally, the reactants reacted for 300 minutes at 96±1° C. The resulted PLLA product: $M_n$ 5.0×10$^4$, PDI 1.25, monomer conversion rate 100%, snow white.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for synthesizing polylactide (PLA), the method employing RCOOCG wherein R is

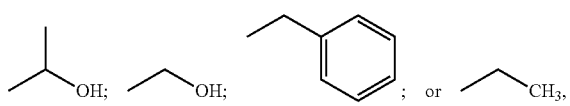

a nontoxic carboxylate (RCOOH) of cyclic guanidine (CG), as a catalyst and organic alcohol R'OH wherein R' represents —CH$_2$CH$_3$ or —(CH$_2$)$_{11}$CH$_3$ as an initiator to catalyze/initiate a living ring-opening polymerization of lactide (LA), and the method comprising:

a) adding monomer LA, the catalyst RCOOCG, and the initiator R'OH to a reaction still, wherein an initial molar ratio of the monomer to the catalyst is [LA]$_0$/[RCOOCG]$_0$=1000-1500:1, an initial molar amount [R'OH]$_0$ of the initiator R'OH is determined by a number average molecular weight ($M_n$) of a target product PLA, which is calculated as follows:

$$[R'OH]_0 = \frac{[LA]_0 \times 144}{M_n}$$

wherein [LA]$_0$ is an initial molar amount of the monomer;

b) removing air in the reaction still through a series of repeated operation of "vacuum pumping-nitrogen injection", sealing the reaction still after a pressure in the reaction still is constant at between 1.0 and 0.1 torr; heating the reaction still with stirring to a temperature between 95 and 96° C. in 30 to 40 minutes; allowing reactants in the reaction still to react for 5 to 300 minutes at a temperature between 96±1 and 130±1° C.

2. The method of claim 1, wherein the number average molecular weight ($M_n$) of PLA is controlled at between 0.5×10$^4$ and 5.0×10$^4$ by adjusting the initial molar ratio of the monomer to the initiator [LA]$_0$/[R'OH]$_0$; a polydispersity index (PDI) of the product PLA is between 1.10 and 1.25; a conversion rate of the monomer in the polymerization is 100%, and the product is snow white.

3. The method of claim 1, wherein the lactide (LA) is L-lactide (LLA), D-lactide (DLA), or rac-lactide (DLLA); the polylactide (PLA) is anyone selected from poly(L-lactide) (PLLA), poly(D-lactide) (PDLA), or poly(D,L-lactide) (PDLLA).

4. The method of claim 2, wherein the lactide (LA) is L-lactide (LLA), D-lactide (DLA), or rac-lactide (DLLA); the polylactide (PLA) is anyone selected from poly(L-lactide) (PLLA), poly(D-lactide) (PDLA), or poly(D,L-lactide) (PDLLA).

5. The method of claim 1, wherein the catalyst RCOOCG is produced by a reaction of cyclic guanidine (CG) and a nontoxic organic carboxylic acid (RCOOH); RCOOH is lactic acid, glycolic acid, benzoic acid, or acetic acid; a synthesis reaction of the catalyst and a chemical formula of CG are as follows:

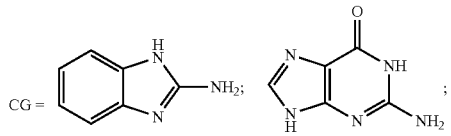

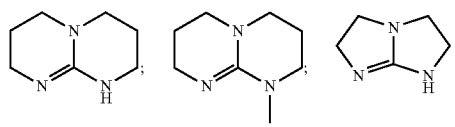

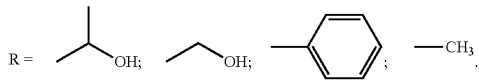

6. The method of claim 2, wherein the catalyst RCOOCG is produced by a reaction of cyclic guanidine (CG) and a nontoxic organic carboxylic acid (RCOOH); RCOOH is lactic acid, glycolic acid, benzoic acid, or acetic acid; a synthesis reaction of the catalyst and a chemical formula of CG are as follows:
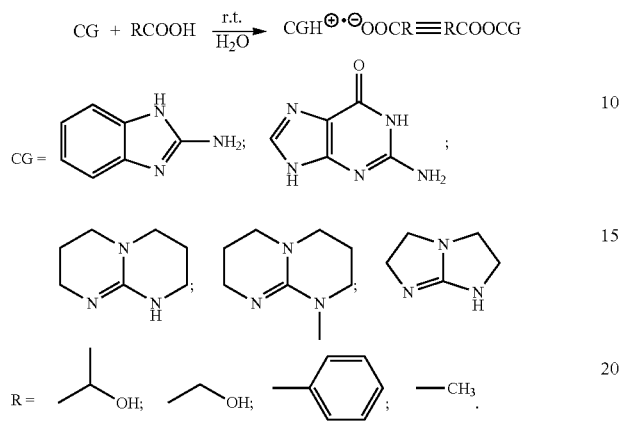
7. The method of claim 1, wherein the organic initiator R'OH is ethanol or lauryl alcohol.
8. The method of claim 2, wherein the organic initiator R'OH is ethanol or lauryl alcohol.
* * * * *